April 6, 1937.   L. J. JUMAU   2,076,238
METHOD OF CHARGING THE ELECTRIC ACCUMULATORS
OF LEAD HAVING SLIGHT LOCAL ACTIONS
Filed March 23, 1936
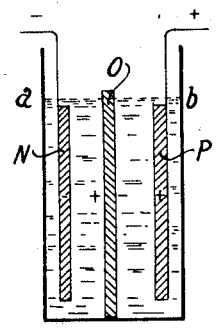
Inventor
Lucien Jules Jumau
By
Attorneys Patented Apr. 6, 1937

2,076,238

UNITED STATES PATENT OFFICE 2,076,238

METHOD OF CHARGING THE ELECTRIC ACCUMULATORS OF LEAD HAVING SLIGHT LOCAL ACTIONS

Lucien Jules Jumau, Paris, France, assignor to Compagnie Generale d'Electricite, Paris, France Application March 23, 1936, Serial No. 70,380
In Germany April 15, 1935

1 Claim. (Cl. 136—32)

For certain purposes, electric accumulators should have very slight local actions, e. g. in cases where current is not conveniently available for recharging accumulators and where they should be able to discharge for very long periods of time.

Lead accumulators are known which have only very slight local actions and which may remain in service for several months without being recharged.

In general, the plates of these accumulators are of the type with applied oxide. They comprise a grid, the interstices of which are filled with active material. This grid may be of soft lead; a positive grid of soft lead is, however, deformed very quickly due to the easy peroxidation of the soft lead. Moreover, it is preferred to make the positive grids of lead alloys such as antimonial lead, the peroxidation of which is much slower.

Unfortunately, the positive grid of lead alloy has the disadvantage of introducing into the electrolyte, during charging, small quantities of substances other than lead, for example antimony, which are deposited on the spongy lead of the negative plate. Couples such as the lead-sulphuric acid-antimony couple are thus produced on the negative electrode and during operation of these couples, the lead is converted to lead sulphate, while the hydrogen is released on to the deposited impurity, e. g. antimony. There is thus produced a local discharge of the negative electrode.

While this local action on the negative electrode may not be of much importance in ordinary uses of accumulators, it is of importance where the accumulators are only recharged at long intervals of time.

To overcome this disadvantage, the positive and the negative might obviously be recharged separately in the presence of plates of soft lead but this method necessitates disassembling the element at each charge.

The method of the present invention is characterized by this that during charging there is introduced, between the electrodes of each element, a solid plate of soft lead shaped to the internal form of the accumulator box and the upper part of which extends above the level of the electrolyte, so that during charging the accumulator is divided into two elements in series, the intermediate plate being withdrawn after charging. This operation is easy to carry out since the elements in question comprise, in general, thick plates sufficiently spaced.

The accompanying drawing illustrates diagrammatically, by way of example, the arrangement applied to an accumulator having a positive plate P, the grid of which is of antimonial lead and a negative plate N. If the soft lead plate O thus introduced has the internal form of the accumulator box and extends above the level $a.b$ of the electrolyte, it acts during charging as a bipolar electrode, the face towards the positive plate of the element being charged negatively, while the face towards the negative plate is converted to peroxide. Since the plate O is of soft lead, during charging the negative electrode N cannot be contaminated with antimony. The antimony coming from the charging of the positive plate P is deposited during charging on the adjacent face of the plate O and is finally eliminated from the accumulator since the plate O is withdrawn after charging.

Obviously, the voltage required for this charge is double the normal charging voltage of one element, but by means of a very slight additional expenditure of electric energy, the accumulator may keep during the whole of its life this valuable property of having extremely slight local actions.

Where the accumulator includes a number of plates greater than two it is sufficient to introduce a plate of soft lead O in each space and to connect externally all the plates O in order to obtain the same result as above indicated in connection with an accumulator having two plates.

Having now particularly described and ascertained the nature of my said invention and in what manner the same is to be performed, I declare that what I claim is:

In electric accumulators of lead with positive plates constituted by a lead alloy, the method of charging the elements comprising the following steps, first introducing between the electrodes of each element a solid plate of soft lead of the internal form of the accumulator box and the upper part of which extends above the level of the electrolyte, applying a charging potential to the electrodes, and then withdrawing the intermediate plate from each element after the completion of the charging process.

LUCIEN JULES JUMAU.